(12) United States Patent
Chang et al.

(10) Patent No.: US 9,367,654 B2
(45) Date of Patent: Jun. 14, 2016

(54) VARIATION MODELING

(71) Applicant: Taiwan Semiconductor Manufacturing Company Limited, Hsin-Chu (TW)

(72) Inventors: Chi-Wen Chang, Yuanlin Township (TW); Hui Yu Lee, Hsin-Chu (TW); Jui-Feng Kuan, Zhubei (TW); Yi-Kan Cheng, Taipei (TW); Chin-Hua Wen, Toufen Township (TW); Wen-Shen Chou, Zhubei (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 0 days.

(21) Appl. No.: 14/846,975

(22) Filed: Sep. 7, 2015

(65) Prior Publication Data
US 2015/0379174 A1 Dec. 31, 2015

Related U.S. Application Data

(63) Continuation-in-part of application No. 13/780,110, filed on Feb. 28, 2013, now Pat. No. 9,129,082.

(51) Int. Cl.
*G06F 17/50* (2006.01)

(52) U.S. Cl.
CPC ........ *G06F 17/5022* (2013.01); *G06F 17/5081* (2013.01); *G06F 2217/06* (2013.01); *G06F 2217/12* (2013.01); *G06F 2217/16* (2013.01); *Y02P 90/265* (2015.11)

(58) Field of Classification Search
CPC ............ G06F 2217/06; G06F 17/5009; G06F 17/5022; G06F 17/5045; G06F 17/5068; G06F 17/5081
USPC .................................. 320/106–107, 110–111
See application file for complete search history.

(56) References Cited

U.S. PATENT DOCUMENTS

| | | | | |
|---|---|---|---|---|
| 5,486,002 A * | 1/1996 | Witler | ................ | A63B 24/0021 473/199 |
| 6,480,993 B1 * | 11/2002 | Suto | .................... | G06F 17/5077 716/122 |
| 8,129,269 B1 * | 3/2012 | Bao | .................... | H01L 21/02126 257/E21.273 |
| 8,490,244 B1 * | 7/2013 | Joshi | ................... | G06F 17/5068 716/110 |
| 2005/0258513 A1 * | 11/2005 | Eshun | .................... | H01C 1/142 257/536 |
| 2006/0002723 A1 * | 1/2006 | Suzuki | ............... | G03G 15/0893 399/27 |
| 2008/0175421 A1 * | 7/2008 | Chizari | .................... | H04L 27/04 381/315 |
| 2008/0273774 A1 * | 11/2008 | Mikhail | ................ | G06F 19/321 382/128 |
| 2009/0261327 A1 * | 10/2009 | Schaefer | ........... | H01L 21/02532 257/52 |
| 2012/0037695 A1 * | 2/2012 | Liu | .................... | G06F 17/30879 235/375 |
| 2012/0185788 A1 * | 7/2012 | Fong | ....................... | G06F 3/018 715/765 |
| 2013/0171819 A1 * | 7/2013 | Miyajima | ......... | H01L 21/76811 438/667 |
| 2013/0216151 A1 * | 8/2013 | Samaniego | ........... | G01S 7/4021 382/255 |

* cited by examiner

*Primary Examiner* — Paul Dinh
(74) *Attorney, Agent, or Firm* — Cooper Legal Group, LLC

(57) ABSTRACT

A method for back-end-of-line variation modeling is provided. A bounding box is defined within a design layout. A back-end-of-line variation parameter is determined for the bounding box. The back-end-of-line variation parameter is applied as a constraint for simulation of the design layout.

20 Claims, 9 Drawing Sheets

US 9,367,654 B2

VARIATION MODELING

CROSS-REFERENCE TO RELATED APPLICATIONS

This application is a continuation of and claims benefit to U.S. patent application Ser. No. 13/780,110, filed on Feb. 28, 2013 and titled "VARIATION FACTOR ASSIGNMENT," the entire disclosure of which is hereby incorporated by reference.

BACKGROUND

An integrated circuit design flow can incorporate pre-layout simulation and post-layout simulation to determine whether a design layout, such as a circuit design or a layout generated by a layout process, matches a design specification.

DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
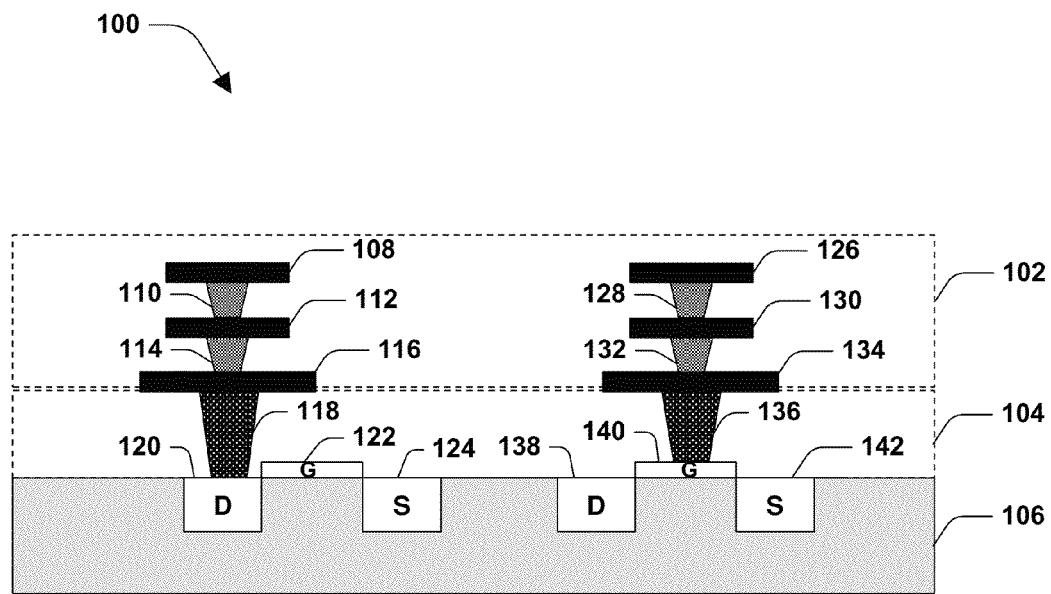
FIG. 1 is a sectional view illustrating of a portion of a semiconductor arrangement, according to some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a sectional view illustrating a portion of a semiconductor arrangement 100, according to some embodiments. In some embodiments, the semiconductor arrangement 100 comprises a front-end-of-line portion 106, a middle-end-of-line portion 104, and a back-end-of-line portion 102. In some embodiments, the front-end-of-line portion 106 comprises devices, such as transistors, capacitors, resistors, etc. In some embodiments, a first drain 120, a first gate 122, and a first source 124 of a first transistor and a second drain 138, a second gate 140, and a second source 142 of a second transistor are substantially comprised within in the front-end-of-line portion 106. In some embodiments, the middle-end-of-line portion 104 comprises interconnect structures, such as a first interconnect structure 118 providing a first connection to the first drain 120 of the first transistor and a second interconnect structure 136 providing a second connection to the second gate 140 of the second transistor. In some embodiments, the interconnect structures comprise a conductive material, such as copper or other metal.

In some embodiments, the back-end-of-line portion 102 comprises contact pads, interconnect wires, traces, vias, metal layers, etc. In some embodiments, a first metal structure 116, a first via 114, a second metal structure 112, a second via 110, and a third metal structure 108 are comprised within the back-end-of-line portion 102, and provide connectivity, through the first interconnect structure 118, to the first drain 120 of the first transistor. The first metal structure 116 is connected to the first interconnect structure 118 and the first via 114. The first via 114 is connected to the second metal structure 112. The second metal structure 112 is connected to the second via 110. The second via 110 is connected to the third metal structure 108. In some embodiments, a fourth metal structure 134, a third via 132, a fifth metal structure 130, a fourth via 128, and a sixth metal structure 126 are comprised within the back-end-of-line portion 102, and provide connectivity, through the second interconnect structure 136, to the second gate 140 of the second transistor. The fourth metal structure 134 is connected to the second interconnect structure 136 and the third via 132. The third via 132 is connected to the fifth metal structure 130. The fifth metal structure 130 is connected to the fourth via 128. The fourth via 128 is connected to the sixth metal structure 126.

In some embodiments, the metal structures, vias, and interconnect structures experience different degrees of variation during fabrication, such as variations in size, shape, or other characteristics that are different than a design layout or a design specification. In some embodiments, the degree of variation is affected by distance to a boundary, a property of a layer within which a structure or via is formed, a density of structures, vias, devices, etc. within an area, a surrounding environment, a pattern property, a device type, a device characteristic, a color property, a corner, or a variety of other factors that will either increase or decrease variation. Accordingly, in some embodiments provided herein, individual variation parameters are specified for different bounding boxes within the design layout, such as within the back-end-of-line portion 102 or the middle-end-of-line portion 104, which improves accuracy of observing and taking into account different variations during design, improves yield, and improves the ability to utilize devices having smaller, tighter, less tolerant, etc. critical dimensions.

According to some embodiments, a middle-end-of-line variation parameter is determined for the middle-end-of-line portion 104. In some embodiments, the middle-end-of-line variation parameter is derived from a middle-end-of-line factor applied to a variation parameter for the front-end-of-line portion 106, such as where the middle-of-line-variation parameter is a product of the middle-end-of-line factor and the variation parameter for the front-end-of-line portion 106. In some embodiments, at least one of the middle-end-of-line variation parameter or the middle-end-of-line factor is derived from at least one of a middle-end-of-line density, a middle-end-of-line color property, a middle-end-of-line corner, a device characteristic, a gate length, a device width, a device type, a distance to a boundary of a bounding box, or a middle-end-of-line layer property such as a size property, a density property, a material property, a geometry property, a pattern property, etc. In some embodiments, at least one of a parasitic resistance or a parasitic capacitance varies by about 10% to about 15% between different color assignments, where a color assignment is a type of color property. According to some embodiments, a parasitic resistance for a first color assignment varies by about 10% to about 15% as compared to a second color assignment, where the second color assignment is different than the first color assignment. In some embodiments, at least one of the middle-end-of-line variation parameter or the middle-end-of-line factor is specified by a designer through a layout verse schematic (LVS) tool or a resistance capacitance (RC) tool.

According to some embodiments, a back-end-of-line variation parameter is determined for the back-end-of-line portion 102. In some embodiments, the back-end-of-line variation parameter is derived from a back-end-of-line factor applied to the variation parameter for the front-end-of-line portion 106, such as where the back-of-line-variation parameter is a product of the back-end-of-line factor and the variation parameter for the front-end-of-line portion 106. In some embodiments, at least one of the back-end-of-line variation parameter or the back-end-of-line factor is derived from at least one of a back-end-of-line density, a back-end-of-line color property, a back-end-of-line corner, a device characteristic, a gate length, a device width, a device type, a distance to a boundary of a bounding box, or a back-end-of-line layer property such as a size property, a density property, a material property, a geometry property, a pattern property, etc. In some embodiments, at least one of a parasitic resistance or a parasitic capacitance varies by about 10% to about 15% between different color assignments, where a color assignment is a type of color property. In some embodiments, at least one of the back-end-of-line variation parameter or the back-end-of-line factor is specified by the designer through a layout verse schematic (LVS) tool or a resistance capacitance (RC) tool.

Figure 2:
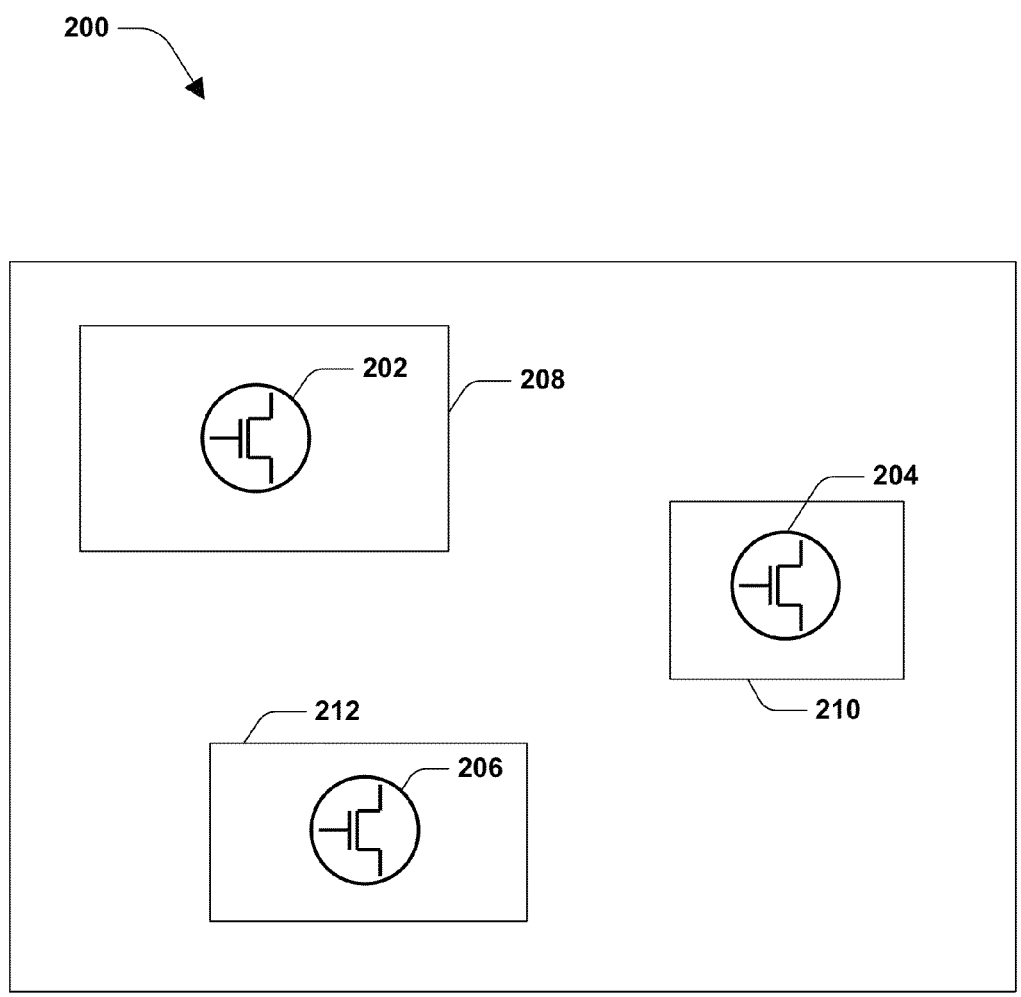
FIG. 2 is a top down view illustrating a design layout of a semiconductor arrangement, according to some embodiments.

FIG. 2 is a top down view illustrating a design layout 200 of a semiconductor arrangement according to some embodiments. In some embodiments, at least some of the design layout 200 of FIG. 2 corresponds to at least some of the semiconductor arrangement 100 of FIG. 1. Back-end-of-line variation parameters and middle-end-of-line variation parameters are determined for bounding boxes defined for the design layout 200 in some embodiments. The bounding box corresponds to a density calculation region in some embodiments. The bounding box is defined by a designer or is defined based upon a device characteristic of a device within the bounding box because device characteristics are sensitive to drawn geometry and surrounding pattern(s), and thus the same device located at different locations or with different surrounding patterns have different device characteristics in some embodiments. The device characteristic comprises at least one of a device type, such as NMOS, PMOS, FET, diode, etc.; a length, such as a channel length, a gate length, etc.; a width, such as a channel width, a gate width, etc. In some embodiments, a first bounding box 208, having a first size, is defined around a first transistor 202, a second bounding box 210, having a second size, is defined around a second transistor 204, a third bounding box 212, having a third size, is defined around a third transistor 206, etc. In some embodiments, the first size or area of the first bounding box 208 is greater than the second size of the second bounding box 210 and the third size of the third bounding box 212 because the first transistor 202 has first aspects, such as a first gate width, a first channel length, a first source/drain doping concentration, etc. that are more sensitive to surrounding environmental factors than corresponding second aspects of the second transistor 204 and third aspects of the third transistor 206. According to some embodiments, the first bounding box 208 has the greater size to encompass more of a surrounding environment due to the relatively greater sensitivity of the first aspects of the first transistor 202 to surrounding environmental factors as compared to the degree to which the second aspects of the second transistor 204 and the third aspects of the third transistor 206 are affected by surrounding environmental factors. According to some embodiments, a first back-end-of-line variation parameter and a first middle-end-of-line variation parameter are determined for the first bounding box 208, a second back-end-of-line variation parameter and a second middle-end-of-line variation parameter are determined for the second bounding box 210, and a third back-end-of-line variation parameter and a third middle-end-of-line variation parameter are determined for the third bounding box 212. According to some embodiments, individual variation parameters are determined for different bounding boxes because devices and structures respectively comprised within the different bounding boxes experience different variation(s) during fabrication.

Figure 3:
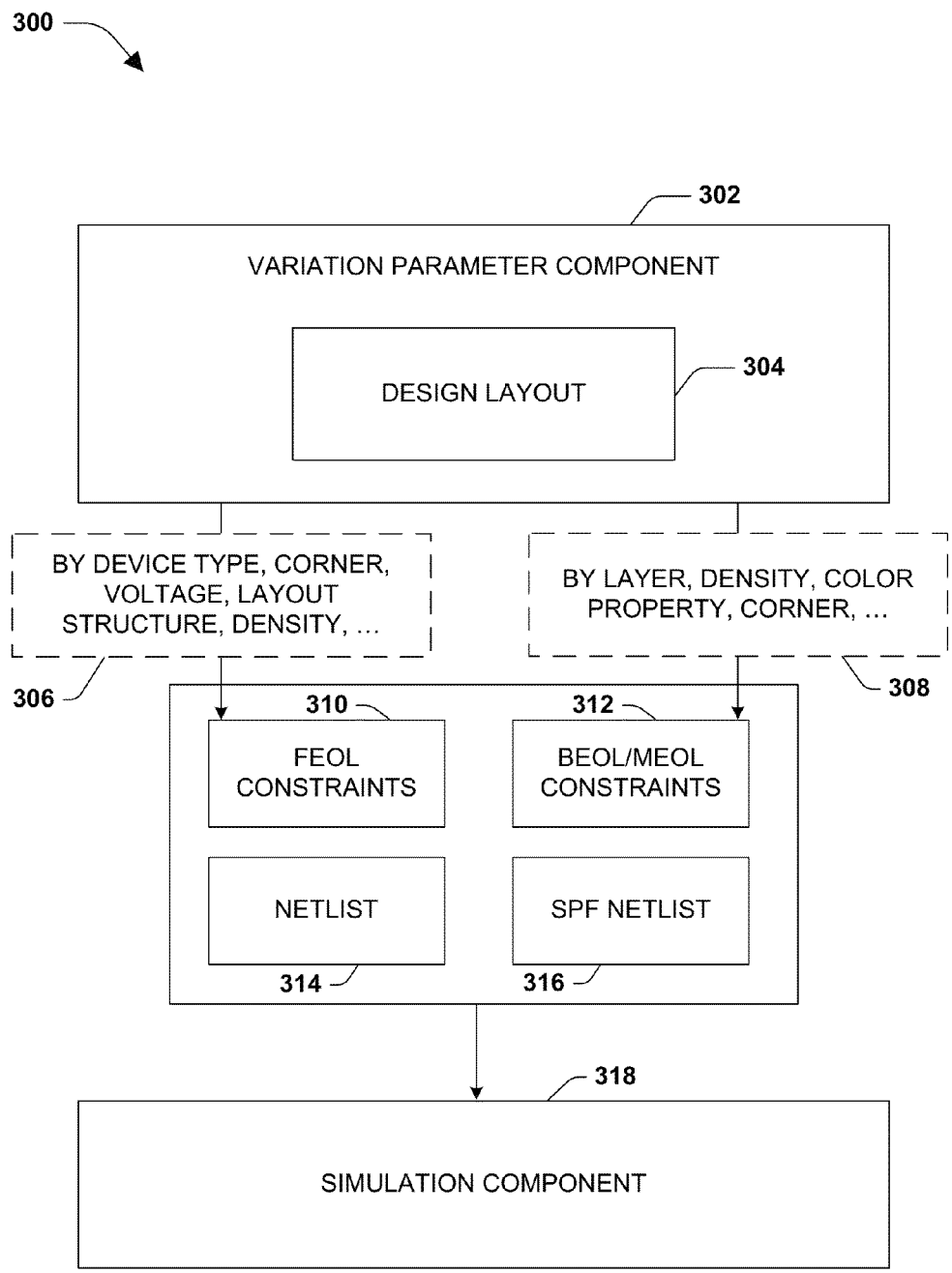
FIG. 3 is an illustration of a system, comprising a variation parameter component and a simulation component, for variation modeling, according to some embodiments.

FIG. 3 is an illustration of a system 300, comprising a variation parameter component 302 and a simulation component 318, for variation modeling, according to some embodiments. The variation parameter component 302 is configured to define one or more bounding boxes within a design layout 304 of a semiconductor arrangement, according to some embodiments. In some embodiments, at least some of the design layout 304 of FIG. 3 corresponds to at least some of the semiconductor arrangement 100 of FIG. 1. In some embodiments, at least some of the design layout 304 of FIG. 3 corresponds to at least some of the design layout 200 of FIG. 2. In some embodiments, a location of a bounding box is specified by a designer or is automatically defined based upon a location of a device. According to some embodiments, the variation parameter component 302 is configured to specify front-end-of-line constraints 310 for a front-end-of-line portion of the design layout 304, such as a device within the bounding box, based up various front-end-of-line properties 306 such as a front-end-of-line device type, a front-end-of-line corner, a front-end-of-line voltage, a front-end-of-line layout structure, a front-end-of-line density, etc. The front-end-of-line constraints 310 and a netlist 314, derived from the design layout 304, are used during simulation by the simulation component 318, according to some embodiments.

According to some embodiments, the variation parameter component 302 is configured to specify constraints 312, such as at least one of back-end-of-line constraints or middle-end-of-line constraints, for at least some of the one or more bounding boxes. In some embodiments, the constraints 312 comprise a back-end-of-line constraint corresponding to a back-end-of-line variation parameter for a back-end-of-line portion of the design layout 304. According to some embodiments, the variation parameter component 302 is configured to derive the back-end-of-line variation parameter based upon various properties 308, such as a back-end-of-line layer property, a back-end-of-line density, a back-end-of-line color property, a back-end-of-line corner, a horizontal property corresponding to a horizontal distance from a target location to a boundary of a bounding box, a vertical property corresponding to a vertical distance from the target location to a boundary of the bounding box, an omni-direction property corresponding to omni-directional distances from the target location to one or more boundaries of the bounding box, etc. In some embodiments, the back-end-of-line variation parameter comprises a variable value corresponding to a distance to one or more boundaries of the bounding box.

In some embodiments, the constraints 312 comprise a middle-end-of-line constraint corresponding to a middle-end-of-line variation parameter for a middle-end-of-line portion of the design layout 304. According to some embodiments, the variation parameter component 302 is configured to derive the middle-end-of-line variation parameter based upon various properties 308, such as a middle-end-of-line layer property, a middle-end-of-line density, a middle-end-of-line color property, a middle-end-of-line corner, a horizontal property corresponding to a horizontal distance from a target location to a boundary of the bounding box, a vertical property corresponding to a vertical distance from the target location to a boundary of the bounding box, an omni-direction property corresponding to omni-directional distances from the target location to one or more boundaries of the bounding box, etc. In some embodiments, the middle-end-of-line variation parameter comprises a variable value corresponding to a distance to one or more boundaries of the bounding box.

According to some embodiments, at least one of the back-end-of-line variation parameters or the middle-end-of-line variation parameters are applied as the constraints 312, which are used with a standard parasitic format (SPF) netlist 316 for simulation of the design layout 304. In some embodiments, at least one of a parasitic resistance or a parasitic capacitance is determined based upon at least one of the back-end-of-line variation parameters or the middle-end-of-line variation parameters for simulation. The simulation component 318 is configured to simulate the design layout 304 based upon the front-end-of-line constraints 310 and the constraints 312, such as the back-end-of-line constraints and the middle-end-of-line constraints, to generate a result, according to some embodiments. In some embodiments, the result is used to modify a physical feature of the design layout 304, such as a gate length, gate height, channel length, channel width, via height, via length, via taper, thickness of a metal line or metal structure, spacing between devices or features, etc. In some embodiments, modifying the physical feature results in the physical feature having a value, characteristic, attribute, etc. that is different after the modifying as compared to before the modifying.

Figure 4:
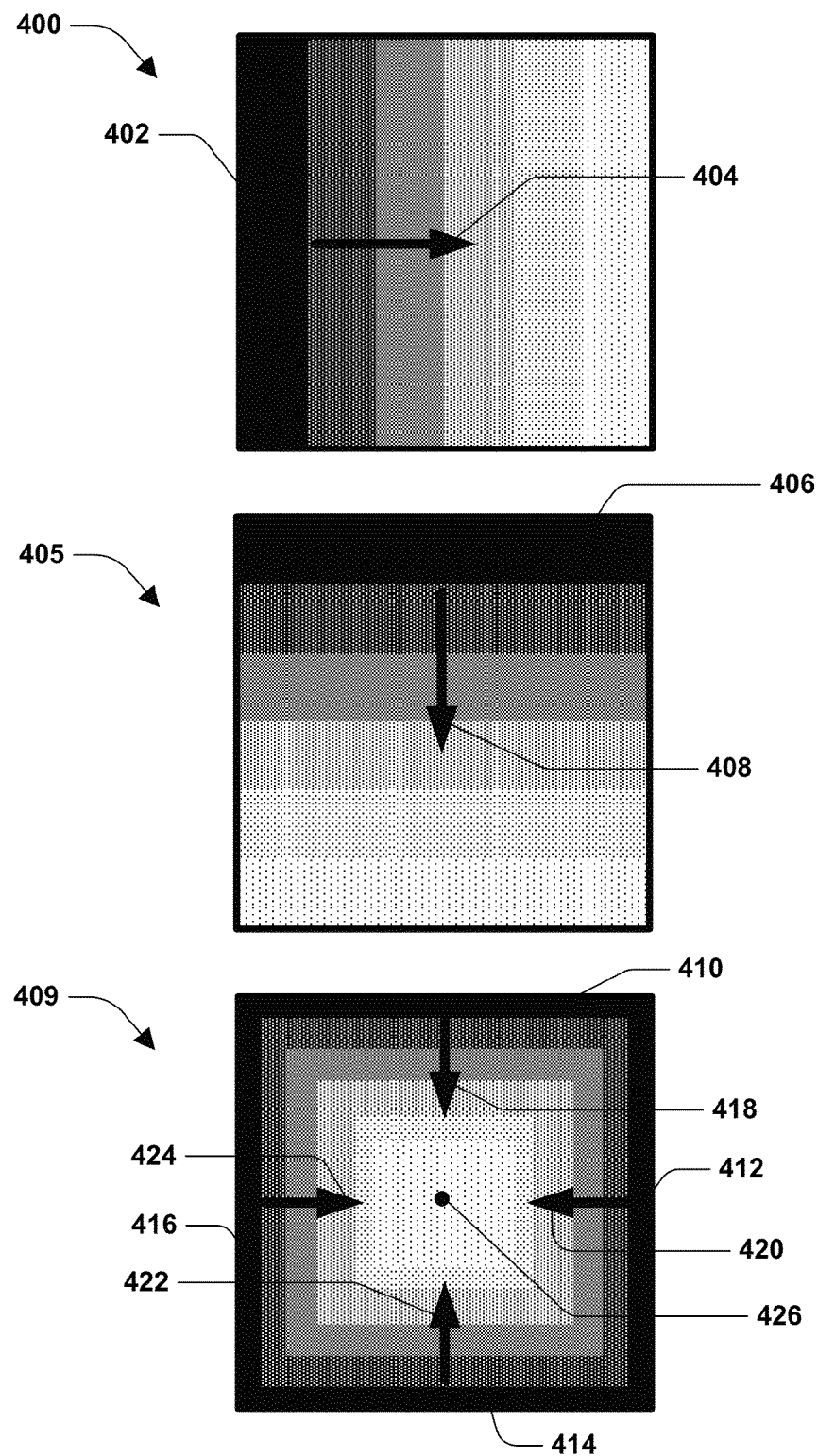
FIG. 4 is an illustration of a horizontal gradient, a vertical gradient, and an omni-directional gradient, according to some embodiments.

FIG. 4 is an illustration of a horizontal gradient 400, a vertical gradient 405, and an omni-directional gradient 409, according to some embodiments, where darker fill patterns correspond to more variation and lighter fill patterns correspond to less variation experienced by devices, structures, features, etc. of a semiconductor arrangement. According to some embodiments, at least some of the semiconductor arrangement referenced with regard to FIG. 4 corresponds to at least one of at least some of the semiconductor arrangement 100 of FIG. 1, at least some of the design layout 200 of FIG. 2, or at least some of the design layout of FIG. 3. According to some embodiments, a boundary referenced with regard to FIG. 4 corresponds to at least some of a boundary side or outermost edge of a bounding box. In some embodiments, variation corresponds to a change in density, width, length, shape, size, or other differences between designed characteristics and physical characteristics of devices, structures, features, etc. According to some embodiments, the horizontal gradient 400 corresponds to a change in variation along a horizontal distance 404 from a boundary 402. According to some embodiments, the closer a device, structure, feature, etc. is, along a horizontal direction, to the boundary 402, the more variation the device, structure, feature, etc. will experience, whereas the further the device, structure, feature, etc. is, along the horizontal direction, from the boundary 402, the less variation the device, structure, feature, etc. will experience. According to some embodiments, a back-end-of-line variation parameter and a middle-end-of-line variation parameter respectively have variable values based upon where a corresponding device, structure, feature, etc. is, along the horizontal direction, from the boundary 402.

According to some embodiments, the vertical gradient 405 corresponds to a change in variation along a vertical distance 408 from a second boundary 406. According to some embodiments, the closer a device, structure, feature, etc. is, along a vertical direction, to the second boundary 406, the more variation the device, structure, feature, etc. will experience, whereas the further the device, structure, feature, etc. is, along the vertical direction, from the second boundary 406, the less variation the device or structure will experience. According to some embodiments, a back-end-of-line variation parameter and a middle-end-of-line variation parameter respectively have variable values based upon where a corresponding device, structure, feature, etc. is, along the vertical direction, from the second boundary 406.

According to some embodiments, the omni-directional gradient 409 corresponds to a change in variation along omni-directional distances from one or more boundaries, such as a first distance 418 from a first boundary 410, a second distance 420 from a second boundary 412, a third distance 422 from a third boundary 414, and a fourth distance 424 from a fourth boundary 416. According to some embodiments, the closer a device, structure, feature, etc. is to a boundary and the further the device, structure, feature, etc. is from a center location 426, the more variation the device, structure, feature, etc. will experience. According to some embodiments, the further the device, structure, feature, etc. is from the boundary and the closer the device, structure, feature, etc. is to the center location 426, the less variation the device, structure, feature, etc. will experience. According to some embodiments, a back-end-of-line variation parameter and a middle-end-of-line variation parameter respectively have variable values based upon where a corresponding device, structure, feature, etc. is from the first boundary 410, the second boundary 412, the third boundary 414, the fourth boundary 416, and the center location 426.

Figure 5:
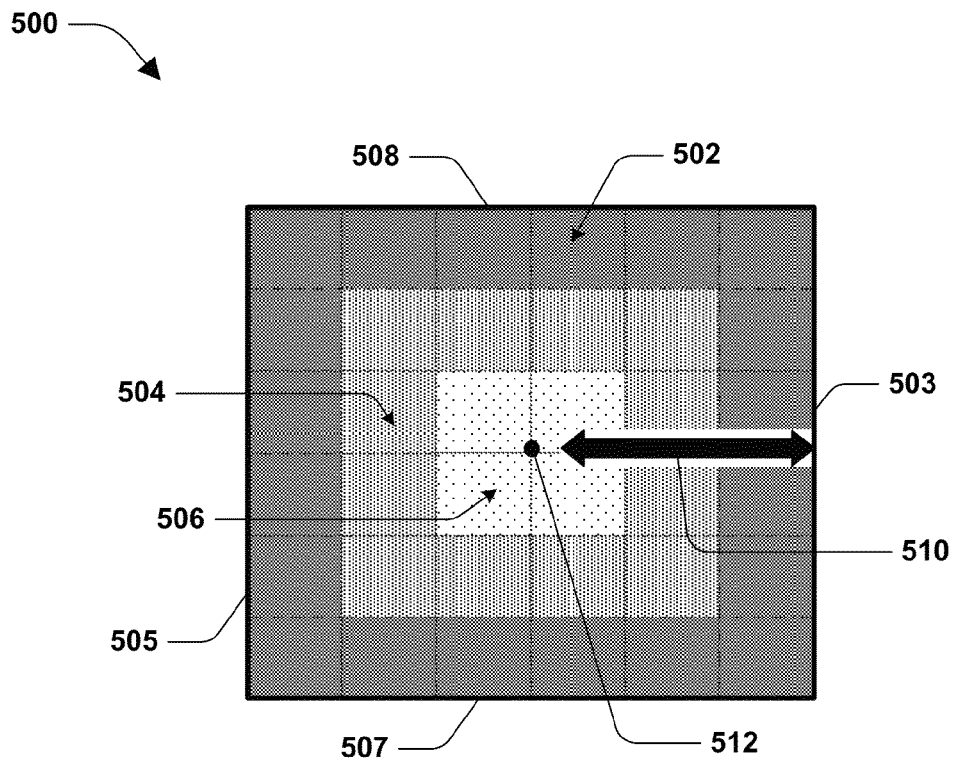
FIG. 5 is a top down view illustrating a bounding box, defined to encompass a portion of a design layout for a semiconductor arrangement, and a graph specifying a relationship between values of a variation parameter and distance of a target location to a boundary side of the bounding box, according to some embodiments.
Figure 5:
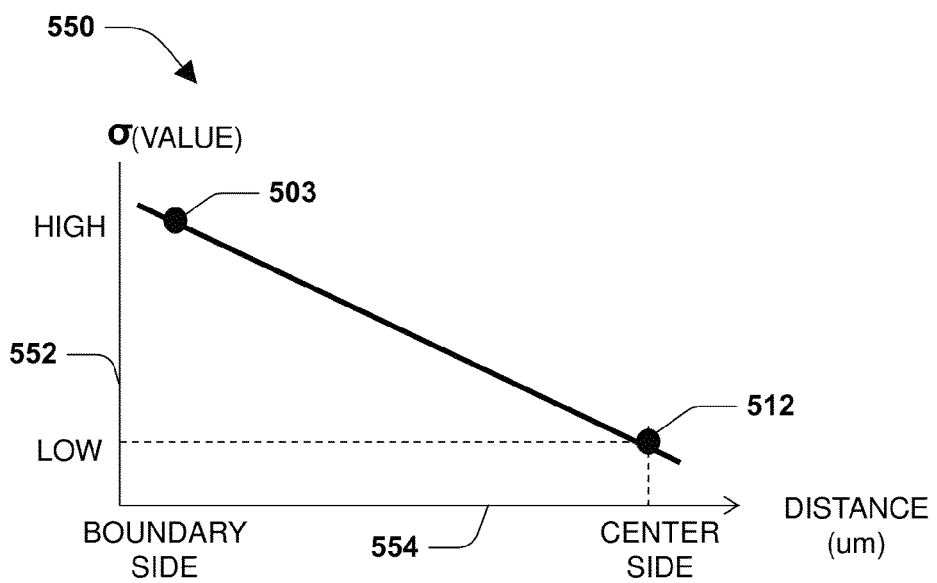

FIG. 5 is a top down view illustrating a bounding box 500, defined to encompass a portion of a design layout for a semiconductor arrangement, and a graph 550 specifying a relationship between values of a variation parameter and distance of a target location to a boundary side of the bounding box 500, according to some embodiments. In some embodiments, at least some of the design layout referenced with regard to FIG. 5 corresponds to at least one of at least some of the semiconductor arrangement 100 of FIG. 1, at least some of the design layout 200 of FIG. 2, or at least some of the design layout of FIG. 3. According to some embodiments, the bounding box 500 has one or more gradients, such as a horizontal gradient, a vertical gradient, or an omni-directional gradient as in FIG. 4. According to some embodiments, the bounding box 500 comprises one or more boundary sides, such as a first boundary side 503, a second boundary side 505 opposite the first boundary side 503, a third boundary side 507, and a fourth boundary side 508 opposite the third boundary side 507. According to some embodiments, the bounding box 500 encompasses portions of the semiconductor arrangement, such as a first region 502, a second region 504, and a third region 506. The first region 502 is illustrated with a first fill pattern, such as a darker fill pattern, to indicate that the first region 502 is closer to a boundary side, and thus will experience more variation during fabrication, in some embodiments. The second region 504 is illustrated with a second fill pattern, such as a medium fill pattern, to indicate that the second region 504 is further from the boundary side than the first region 502, and thus the second region 504 will experience less variation during fabrication than the first region 502, in some embodiments. The third region 506 is illustrated with a third fill pattern, such as a light fill pattern, to indicate that the third region 506 is further from the boundary side than the second region 504, and thus the third region 506 will experience less variation during fabrication than the second region 504, in some embodiments.

The graph 550 has a y-axis 552 representing values of a variation parameter, such as a back-end-of-line variation parameter or a middle-end-of-line variation parameter. The graph 550 has an x-axis 554 representing distances 510 from the first boundary side 503 to a center 512 of the bounding box 500. The variation parameter has a continuous value that increases as a current location approaches the first boundary side 503 and decreases as the current location approaches the center 512, according to some embodiments.

Figure 6:
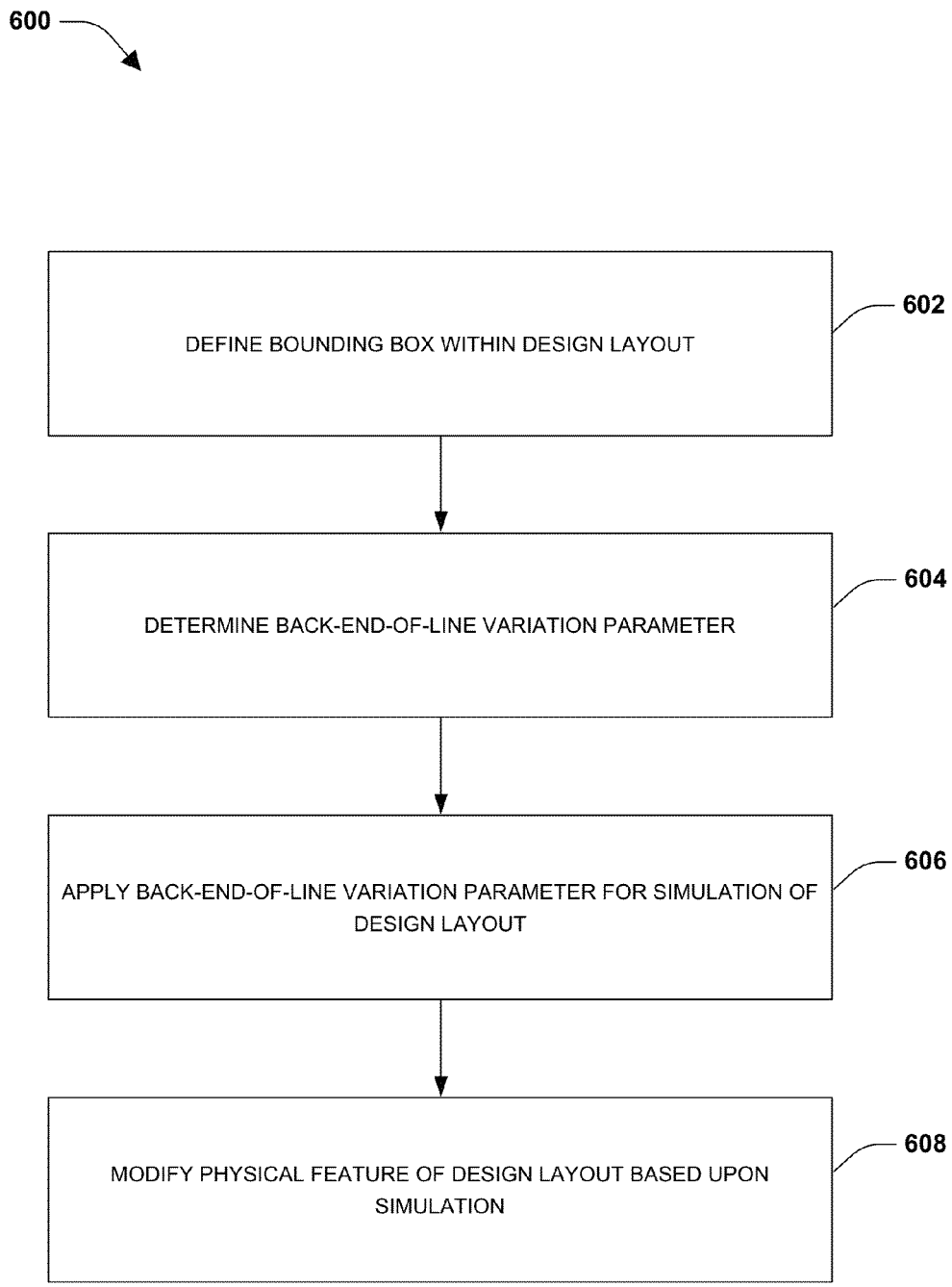
FIG. 6 is a flow diagram illustrating a method of back-end-of-line variation modeling, according to some embodiments.

A method 600 of back-end-of-line variation modeling according to some embodiments is illustrated in FIG. 6. At 602, a bounding box is defined within a design layout of a semiconductor arrangement, according to some embodiments. In some embodiments, the bounding box is defined based upon a device characteristic, such as at least one of a type, a length, or a width associated with a device within the bounding box. At 604, a back-end-of-line variation parameter is determined for the bounding box, according to some embodiments. In some embodiments, the back-end-of-line variation parameter is derived based upon a back-end-of-line layer property, a back-end-of-line density, a back-end-of-line color property, a back-end-of-line corner, a horizontal distance to a first boundary of the bounding box, a vertical distance to a second boundary of the bounding box, or omni-directional distances to one or more boundaries of the bounding box. In some embodiments, the larger a value of the back-end-of-line variation parameter, the more variation is expected during fabrication, such as a variation in at least one of size, shape, or other characteristics of at least one of one or more devices, interconnect structures, vias, metal structures, contact pads, etc.

At 606, the back-end-of-line variation parameter is applied as a back-end-of-line constraint for simulation of the design layout, according to some embodiments. In some embodiments, the back-end-of-line constraint is applied to a region within the bounding box, as opposed to being a global constraint. According to some embodiments, multiple back-end-of-line variation parameters are determined for individual bounding boxes, and different back-end-of-line constraints are respectively applied to different bounding boxes during simulation. At 608, a physical feature of the design layout is modified based upon a result of the simulation, according to some embodiments. In some embodiments, at least one of a location, size, shape, or other characteristic of at least one of a device, an interconnect structure, a via, a metal structure, a contact pad, or other structure, feature, etc. is modified. In some embodiments, a circuit design, such as a circuit design comprising the semiconductor arrangement, is modified based upon a result of the simulation. According to some embodiments, a circuit design is modified responsive to one or more modifications to one or more physical features not reducing a variation to below a threshold.

Figure 7:
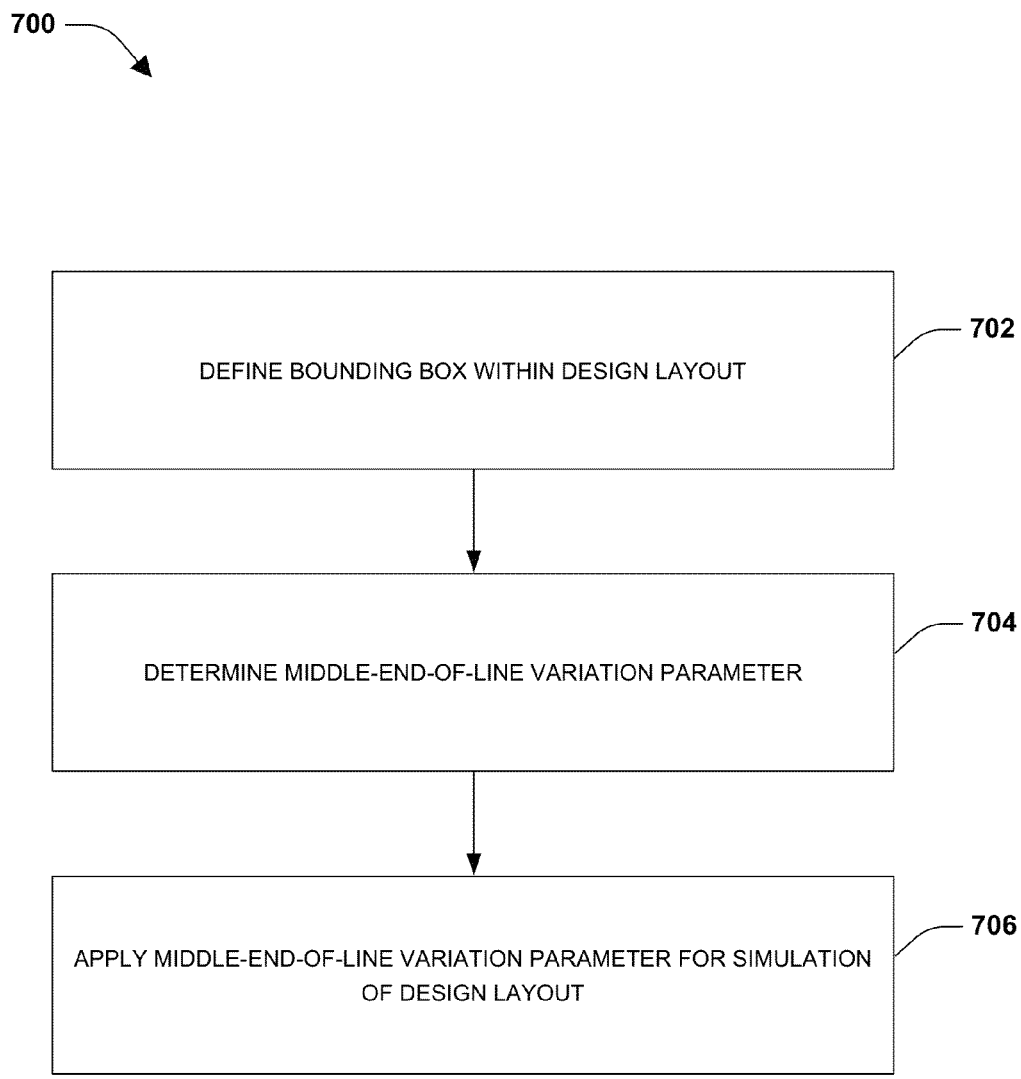
FIG. 7 is a flow diagram illustrating a method of middle-end-of-line variation modeling, according to some embodiments.

A method 700 of middle-end-of-line variation modeling according to some embodiments is illustrated in FIG. 7. At 702, a bounding box is defined within a design layout of a semiconductor arrangement, according to some embodiments. In some embodiments, the bounding box is defined based upon a device characteristic, such as at least one of a type, a length, or a width associated with a device within the bounding box. At 704, a middle-end-of-line variation parameter is determined for the bounding box, according to some embodiments. In some embodiments, the middle-end-of-line variation parameter is derived based upon a middle-end-of-line layer property, a middle-end-of-line density, a middle-end-of-line color property, a middle-end-of-line corner, a horizontal distance to a first boundary of the bounding box, a vertical distance to a second boundary of the bounding box, or omni-directional distances to one or more boundaries of the bounding box. In some embodiments, the larger a value of the middle-end-of-line variation parameter, the more variation is expected during fabrication, such as a variation in at least one of size, shape, or other characteristics of at least one of one or more devices, interconnect structures, vias, metal structures, contact pads, etc.

At 706, the middle-end-of-line variation parameter is applied as a middle-end-of-line constraint for simulation of the design layout, according to some embodiments. In some embodiments, the middle-end-of-line constraint is applied to a region within the bounding box, as opposed to being a global constraint. According to some embodiments, multiple middle-end-of-line variation parameters are determined for individual bounding boxes, and different middle-end-of-line constraints are respectively applied to different bounding boxes during simulation. According to some embodiments, a physical feature of the design layout is modified based upon a result of the simulation. In some embodiments, at least one of a location, size, shape, or other characteristic of at least one of a device, an interconnect structure, a via, a metal structure, a contact pad, or other structure, feature, etc. is modified. In some embodiments, a circuit design, such as a circuit design comprising the semiconductor arrangement, is modified based upon a result of the simulation. According to some embodiments, a circuit design is modified responsive to one or more modifications to one or more physical features not reducing a variation to below a threshold.

Figure 8:
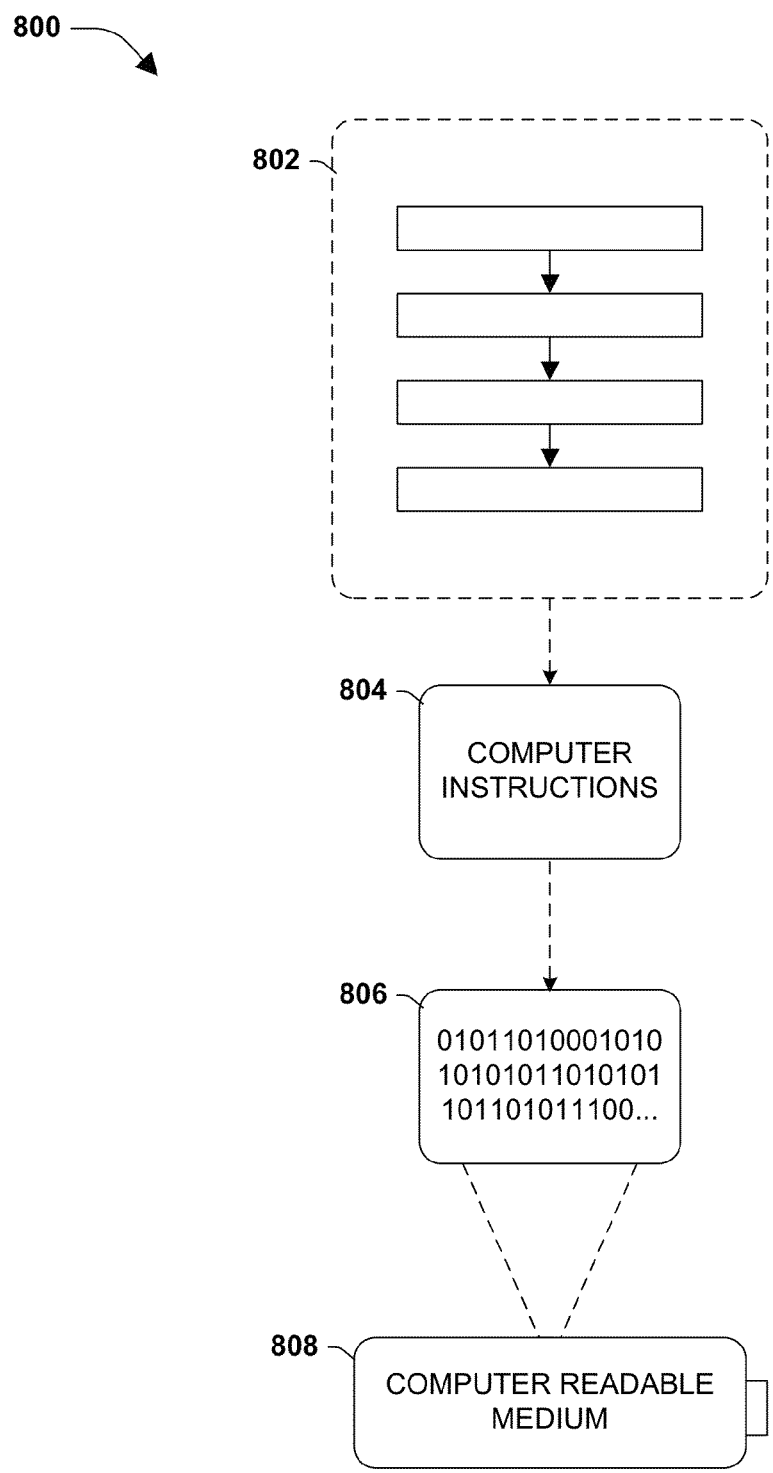
FIG. 8 illustrates a computer-readable medium wherein processor-executable instructions configured to embody one or more of the provisions set forth herein may be comprised, according to some embodiments.

Still another embodiment involves a computer-readable medium comprising processor-executable instructions configured to implement one or more of the techniques presented herein. An exemplary computer-readable medium is illustrated in FIG. 8, wherein the implementation 800 comprises a computer-readable medium 808 (e.g., a CD-R, DVD-R, flash drive, a platter of a hard disk drive, etc.), on which is encoded computer-readable data 806. This computer-readable data 806 in turn comprises a set of computer instructions 804 configured to operate according to one or more of the principles set forth herein. In an embodiment 800, the processor-executable computer instructions 804 are configured to perform a method 802, such as at least some of the method 600 of FIG. 6 or at least some of method 700 of FIG. 7. In an embodiment, the processor-executable instructions 804 are configured to implement a system, such as at least some of the system 300 of FIG. 3. Many such computer-readable media may be devised by those of ordinary skill in the art that are configured to operate in accordance with the techniques presented herein.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
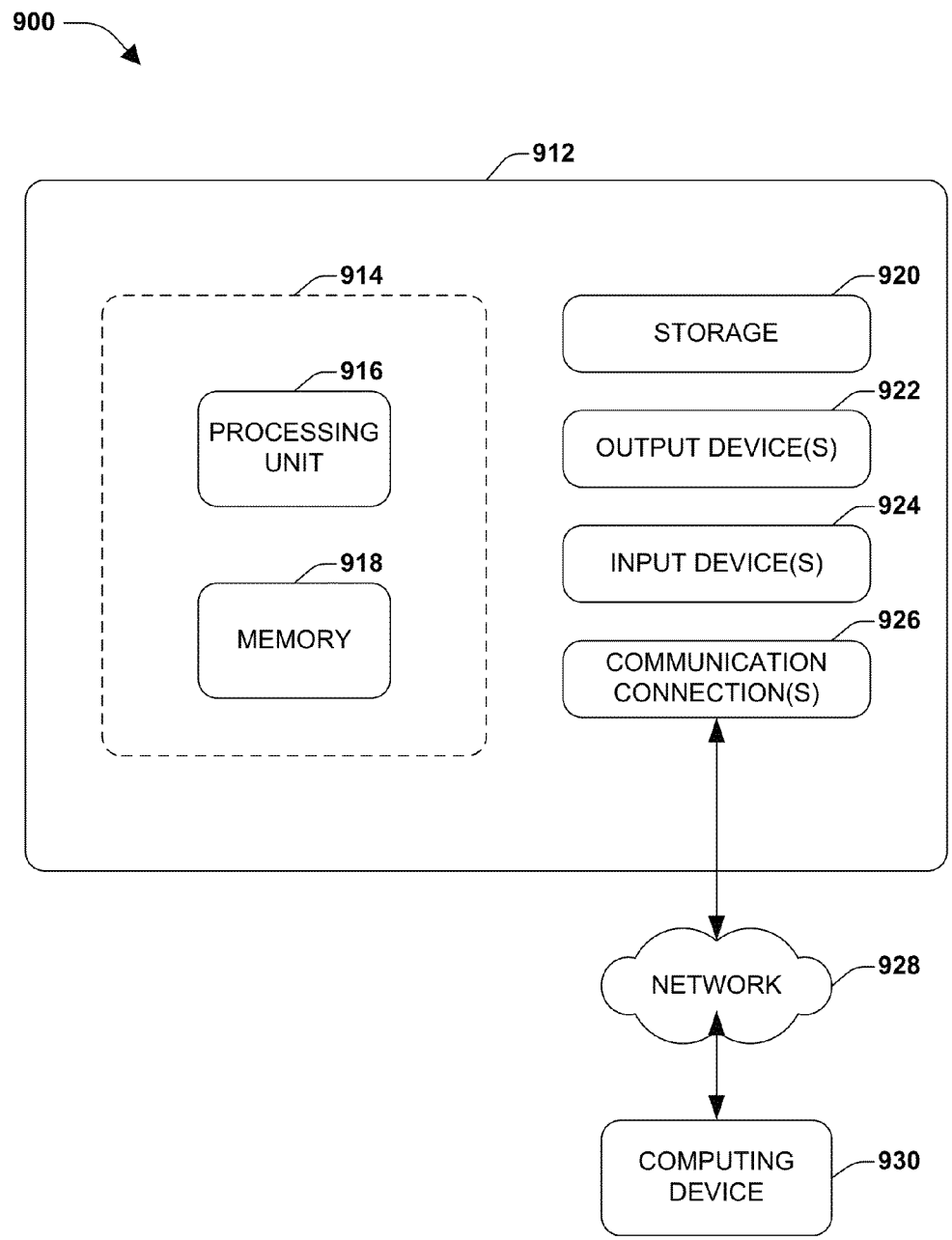
FIG. 9 illustrates a computing environment wherein one or more of the provisions set forth herein may be implemented, according to some embodiments.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 depicts an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In some embodiments, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In some embodiments, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

According to some embodiments, a method for back-end-of-line variation modeling comprises defining a bounding box within a design layout of a semiconductor arrangement. In some embodiments, the method comprises determining a back-end-of-line variation parameter for the bounding box. In some embodiments, the method comprises applying the back-end-of-line variation parameter as a back-end-of-line constraint for simulation of the design layout. In some embodiments, the method comprises modifying a physical feature of the design layout based upon a result of the simulation.

According to some embodiments, a method for middle-end-of-line variation modeling comprises defining a bounding box within a design layout of a semiconductor arrangement. In some embodiments, the method comprises determining a middle-end-of-line variation parameter for the bounding box. In some embodiments, the method comprises applying the middle-end-of-line variation parameter as a middle-end-of-line constraint for simulation of the design layout.

According to some embodiments, a system for back-end-of-line and middle-end-of-line variation modeling comprises a variation parameter component configured to define a bounding box within a design layout of a semiconductor arrangement. In some embodiments, the variation parameter component is configured to determine a back-end-of-line variation parameter for the bounding box. In some embodiments, the variation parameter component is configured to determine a middle-end-of-line variation parameter for the bounding box. In some embodiments, the system comprises a simulation component configured to apply the back-end-of-line variation parameter as a back-end-of-line constraint and the middle-end-of-line variation parameter as a middle-end-of-line constraint for simulation of the design layout.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing the claims.

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

It will be appreciated that layers, features, elements, etc. depicted herein are illustrated with particular dimensions relative to one another, such as structural dimensions or orientations for purposes of simplicity and ease of understanding and that actual dimensions of the same differ substantially from that illustrated herein, in some embodiments. Additionally, a variety of techniques exist for forming the layers features, elements, etc. mentioned herein, such as electrochemical plating (ECP), etching techniques, wet remove techniques, implanting techniques, doping techniques, spin-on techniques, sputtering techniques such as magnetron or ion beam sputtering, growth techniques, such as thermal growth, or deposition techniques such as chemical vapor deposition (CVD), atomic layer deposition (ALD, physical vapor deposition (PVD), etc.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A method for back-end-of-line variation modeling, comprising:
   defining a bounding box for a device within a design layout of a semiconductor arrangement, wherein a size of the bounding box is a function of patterns surrounding the device;
   determining a back-end-of-line variation parameter for the bounding box;
   applying, using a computing device, the back-end-of-line variation parameter as a back-end-of-line constraint for simulation of the design layout; and
   modifying a physical feature of the design layout based upon a result of the simulation, wherein the design layout is implemented in fabrication of the device.

2. The method of claim 1, the determining a back-end-of-line variation parameter comprising:
   deriving the back-end-of-line variation parameter based upon at least one of a back-end-of-line layer property or a back-end-of-line density.

3. The method of claim 1, comprising:
   modifying a circuit design based upon the result of the simulation.

4. The method of claim 1, the determining a back-end-of-line variation parameter comprising:
   deriving the back-end-of-line variation parameter based upon a back-end-of-line color property.

5. The method of claim 1, the determining a back-end-of-line variation parameter comprising:

deriving the back-end-of-line variation parameter based upon a back-end-of-line corner.

6. The method of claim 1, the determining a back-end-of-line variation parameter comprising:
deriving the back-end-of-line variation parameter based upon a horizontal direction property corresponding to a horizontal distance from a target location to a boundary of the bounding box.

7. The method of claim 1, the determining a back-end-of-line variation parameter comprising:
deriving the back-end-of-line variation parameter based upon a vertical direction property corresponding to a vertical distance from a target location to a boundary of the bounding box.

8. The method of claim 1, the determining a back-end-of-line variation parameter comprising:
deriving the back-end-of-line variation parameter based upon an omni-direction property corresponding to omni-directional distances from a target location to one or more boundaries of the bounding box.

9. The method of claim 1, the back-end-of-line variation parameter comprising a variable value corresponding to distance to one or more boundaries of the bounding box.

10. The method of claim 1, the applying the back-end-of-line variation parameter comprising:
determining a parasitic resistance based upon the back-end-of-line variation parameter.

11. The method of claim 1, the applying the back-end-of-line variation parameter comprising:
determining a parasitic capacitance based upon the back-end-of-line variation parameter.

12. The method of claim 1, wherein the size of the bounding box is a function of a device characteristic of the device.

13. The method of claim 12, the device characteristic comprising at least one of a device type, a device length, or a device width.

14. The method of claim 1, comprising:
determining a middle-end-of-line variation parameter for the bounding box; and
applying the middle-end-of-line variation parameter as a middle-end-of-line constraint for the simulation of the design layout.

15. A computer readable medium comprising instructions which when executed by a processing unit of a computing device perform a method for middle-end-of-line variation modeling, comprising:
defining a bounding box for a device within a design layout of a semiconductor arrangement, wherein a size of the bounding box is a function of patterns surrounding the device;
determining a middle-end-of-line variation parameter for the bounding box; and
applying the middle-end-of-line variation parameter as a middle -end-of-line constraint for simulation of the design layout, wherein the design layout is implemented in fabrication of the device.

16. The method of claim 15, comprising:
determining a back-end-of-line variation parameter for the bounding box; and
applying the back-end-of-line variation parameter as a back-end-of-line constraint for the simulation of the design layout.

17. The method of claim 15, the determining a middle-end-of-line variation parameter comprising:
deriving the middle-end-of-line variation parameter based upon at least one of a middle-end-of-line layer property, a middle-end-of-line density, a middle-end-of-line color property, or a middle-end-of-line corner.

18. The method of claim 15, the determining a middle-end-of-line variation parameter comprising:
deriving the middle-end-of-line variation parameter based upon at least one of:
a horizontal direction property corresponding to a horizontal distance from a target location to a first boundary of the bounding box;
a vertical direction property corresponding to a vertical distance from the target location to a second boundary of the bounding box; or
an omni-direction property corresponding to omni-directional distances from the target location to one or more boundaries of the bounding box.

19. The method of claim 15, wherein the size of the bounding box is a function of at least one of a device type, a device length, or a device width of the device.

20. A system for back-end-of-line and middle-end-of-line variation modeling, comprising:
a variation parameter component configured to:
define a bounding box for a device within a design layout of a semiconductor arrangement, wherein a size of the bounding box is a function of patterns surrounding the device;
determine a back-end-of-line variation parameter for the bounding box; and
determine a middle-end-of-line variation parameter for the bounding box; and
a simulation component configured to:
apply the back-end-of-line variation parameter as a back-end-of-line constraint and the middle-end-of-line variation parameter as a middle-end-of-line constraint for simulation of the design layout, wherein the design layout is implemented in fabrication of the device.

* * * * *